United States Patent
Yamaguchi

(10) Patent No.: US 8,294,938 B2
(45) Date of Patent: Oct. 23, 2012

(54) IMAGE FORMING APPARATUS, MANAGEMENT SYSTEM, AND METHOD THEREOF

(75) Inventor: Naohiro Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/718,882

(22) Filed: Mar. 5, 2010

(65) Prior Publication Data

US 2010/0225978 A1  Sep. 9, 2010

(30) Foreign Application Priority Data

Mar. 9, 2009  (JP) ................. 2009-055014

(51) Int. Cl.
 *G06F 3/16* (2006.01)
(52) U.S. Cl. ............ 358/1.15; 358/1.14; 358/1.16; 709/225; 709/224
(58) Field of Classification Search ........... 358/474, 358/1.15, 1.14, 1.16, 1.13, 1.18; 709/225, 709/224, 220, 223
See application file for complete search history.

(56) References Cited

U.S. PATENT DOCUMENTS

| | | | | |
|---|---|---|---|---|
| 6,253,199 B1* | 6/2001 | Wakio et al. | ............ | 1/1 |
| 7,716,319 B2* | 5/2010 | Kataoka et al. | ............... | 709/223 |
| 7,787,143 B2* | 8/2010 | Fukuda | ........... | 358/1.16 |
| 7,852,505 B2* | 12/2010 | Kumagai | ............ | 358/1.15 |
| 7,907,308 B2* | 3/2011 | Namikata | ............ | 358/3.28 |
| 7,933,992 B2* | 4/2011 | Wada | ............ | 709/225 |
| 7,978,352 B2* | 7/2011 | Kanematsu | ............. | 358/1.14 |
| 2006/0136992 A1* | 6/2006 | Shigeeda | ............. | 726/2 |
| 2007/0297003 A1 | 12/2007 | Kuroshima | | |
| 2010/0128298 A1* | 5/2010 | Matsugashita | ........... | 358/1.13 |
| 2010/0225945 A1* | 9/2010 | Hatano | ........... | 358/1.13 |

FOREIGN PATENT DOCUMENTS

JP  2007-304814  11/2007

* cited by examiner

*Primary Examiner* — Negussie Worku

(74) *Attorney, Agent, or Firm* — Canon USA Inc. IP Division

(57) ABSTRACT

An image forming apparatus holds a job to be executed, scan processing performed by an operator in job execution, sheet registration, work content of sheet supply, working hours, information about a worker and the like, in association with a database. Further, the image forming apparatus transmits information about man-hours concerning registration work of sheet information held in the database, to a server.

10 Claims, 14 Drawing Sheets

FIG.6

| LOGIN ID | TIME | WORKER | WORK | PARAMETER |
|---|---|---|---|---|
| 0001 | 2008-06-17 20:15:30 | OPERATOR 1 | LOGIN | |
| 0002 | 2008-06-17 20:39:50 | OPERATOR 1 | PAGE DESCRIPTION REGISTRATION | PAPER="ABC COMPANY-ID789-85G-A4", TRAY 1 |
| 0003 | 2008-06-17 20:43:51 | OPERATOR 1 | CHANGE OF THE NUMBER OF SHEETS TO BE PRINTED | JOB ID="Job-54321", 1 TO 3000 |
| 0004 | 2008-06-17 20:45:29 | OPERATOR 1 | PRINTING | JOB ID="Job-54321" |
| 0005 | 2008-06-17 21:15:29 | OPERATOR 1 | PAPER SUPPLY | TRAY 1, A4 |
| 0006 | 2008-06-17 21:42:22 | OPERATOR 1 | PRINTING END | JOB ID="Job-54321" |
| 0007 | 2008-06-17 22:17:13 | OPERATOR 1 | LOGIN | |

```
<?xml version='1.0' encoding='utf-8' ?>
<JDF JobID="Job-54321"...>
...
<Auditpool>                              602
    <Created Author="JDF maker"TimeStamp="2008-06-16T12:34:56+3:00"/>
    <PhaseTime End="2008-06-17T21:42:22+09:00" Start="2008-06-17T20:45:29+09:00"  — 601
Status=" InProgress" StatusDetails=" Good" TimeStamp=" 2008-06-16T21:42:25+09:00" >
    <Device DeviceID=" XXX" JMFURL=" http://XXX" />
    <ModulePhaseDescriptiveName=" JobIncoming" DeviceID="12345" DeviceStatus=" Setup"        } JOB
End=" 2008-06-17T20:45:32+09:00" Start=" 2008-06-17T20:45:29+09:00" StatusDetails=" StatusDetails=" Spooling" />  } SPOOL
    <ModulePhaseDescriptiveName=" Printing" DeviceID="XXX" DeviceStatus=" Running"        } PRINT
End=" 2008-06-17T21:42:22+09:00" Start=" 2008-06-17T20:45:47+09:00" StatusDetails=" Good" /> } PROCESSING
</PhaseTime>
</AuditPool>
</JDF>
```

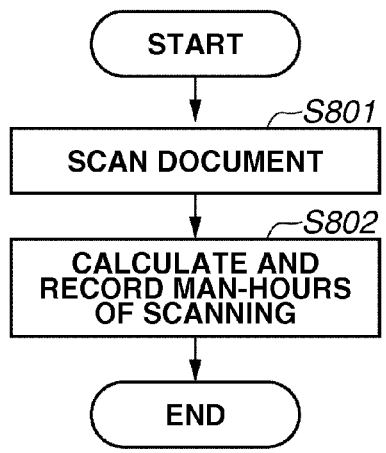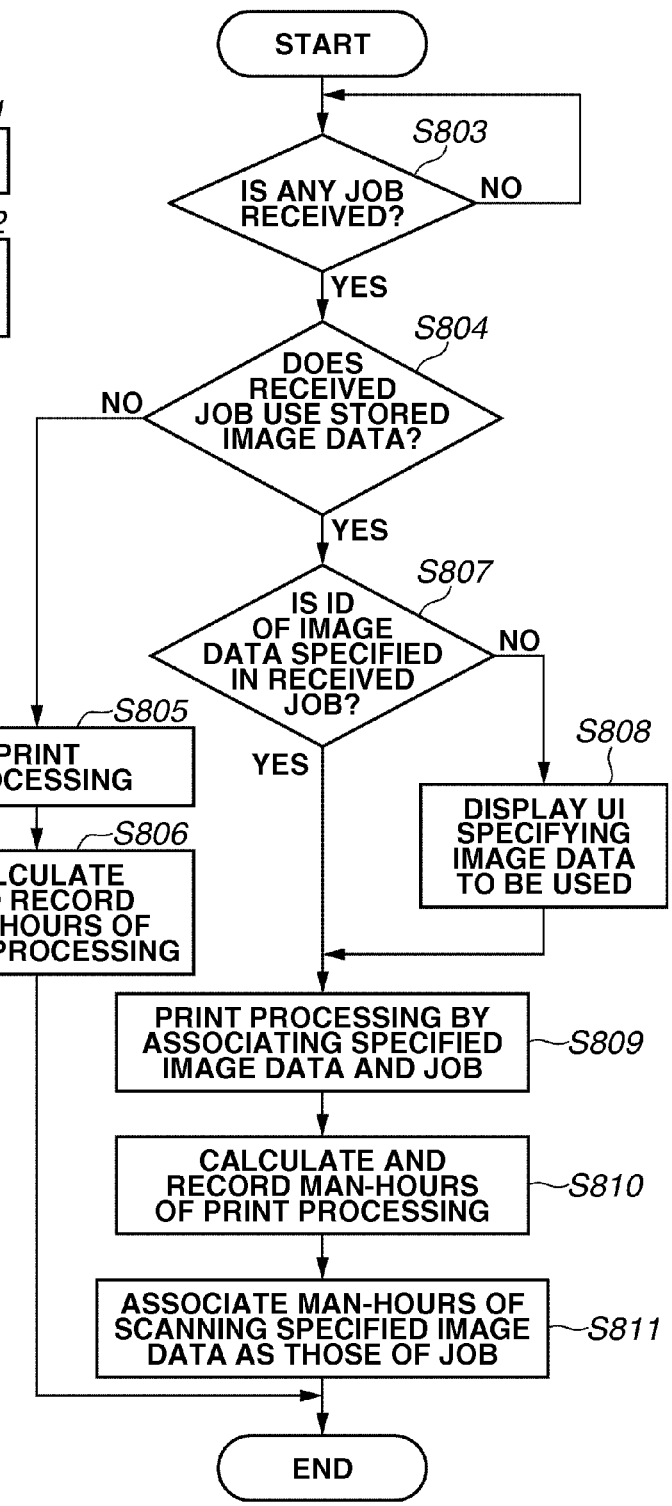

FIG.14

| LOGIN ID | TIME | WORKER | WORK | PARAMETER |
|---|---|---|---|---|
| 0001 | 2008-06-17 19:15:30 | OPERATOR 1 | LOGIN | |
| 0002 | 2008-06-17 19:18:02 | OPERATOR 1 | SCAN WORK START | SCAN IMAGE ID ="ScanImage-0001" |
| 0003 | 2008-06-17 20:13:42 | OPERATOR 1 | SCAN WORK END | |
| 0004 | 2008-06-17 20:39:50 | OPERATOR 1 | PAPER REGISTRATION START | PAPER="ABC COMPANY-ID789-85G-A4", TRAY 1 |
| 0005 | 2008-06-17 20:50:34 | OPERATOR 1 | PAPER REGISTRATION END | |
| 0006 | 2008-06-17 20:43:51 | OPERATOR 1 | CHANGE OF THE NUMBER OF SHEETS TO BE PRINTED | JOB ID="Job-54321", 1 TO 3000 |
| 0007 | 2008-06-17 20:44:16 | OPERATOR 1 | IMAGE ASSOCIATION | JOB ID="Job-54321", SCAN IMAGE ID="ScanImage-0001" |
| 0008 | 2008-06-17 20:45:29 | OPERATOR 1 | PRINTING | JOB ID="Job-54321" |
| 0009 | 2008-06-17 21:15:29 | OPERATOR 1 | PAPER SUPPLY | TRAY 1, A4 |
| 0010 | 2008-06-17 21:42:22 | OPERATOR 1 | PRINTING END | JOB ID="Job-54321" |
| 0011 | 2008-06-17 22:17:13 | OPERATOR 1 | LOGOUT | |

```
<?xml version='1.0' encoding='utf-8' ?>
<JDF JobID="Job-54321"...>
...
<Auditpool>
  <Created Author="JDF maker" TimeStamp="2008-06-16T12:34:56-13:00"/>
  <PhaseTime End="2008-06-17T21:42:22+09:00" Start="2008-06-17T20:45:29+09:00"
Status=" InProgress" StatusDetails=" Good" TimeStamp=" 2008-06-16T21:42:25+09:00" >
  <PhaseTime End="2008-06-17T20:50:34+09:00" Start="2008-06-17T20:39:50+09:00"
Status=" InProgress" StatusDetails=" Good" TimeStamp=" 2008-06-16T21:42:25+09:00" >
  <PhaseTime End="2008-06-17T20:50:34+09:00" Start="2008-06-17T20:39:50+09:00"
Status=" InProgress" StatusDetails=" Good" TimeStamp=" 2008-06-16T21:42:25+09:00" >
    <Device DeviceID=" XXX" JMFURL=" http://XXX" />
    <ModulePhaseDescriptiveName=" JobIncoming" DeviceID="12345" DeviceStatus=" Setup"      ⎫ SCANNING
End=" 2008-06-17T20:45:32+09:00" Start=" 2008-06-17T20:45:29+09:00" StatusDetails==" Spooling" />⎭
     <ModulePhaseDescriptiveName=" JobIncoming" DeviceID="12345" DeviceStatus=" Setup"     ⎫ PAPER
End=" 2008-06-17T20:50:34+09:00" Start=" 2008-06-17T20:39:50+09:00" StatusDetails=" Good" />⎭ REGISTRATION
      <ModulePhaseDescriptiveName=" JobIncoming" DeviceID="12345" DeviceStatus=" Setup"    ⎫ JOB
End=" 2008-06-17T20:50:34+09:00" Start=" 2008-06-17T20:45:29+09:00" StatusDetails=" Spooling" />⎭ SPOOL
      <ModulePhaseDescriptiveName=" Printing" DeviceID="XXX" DeviceStatus=" Running"       ⎫ PRINT
End=" 2008-06-17T21:42:22+09:00" Start=" 2008-06-17T20:45:47+09:00" StatusDetails=" Good" />⎭ PROCESSING
```

IMAGE FORMING APPARATUS, MANAGEMENT SYSTEM, AND METHOD THEREOF

BACKGROUND OF THE INVENTION

1. Field of the Invention

The present invention relates to a technique of managing man-hours needed for an image print processing in an image forming system in a unified manner.

2. Description of the Related Art

With increasing digitization of a printing workflow environment, a Print On Demand (POD) environment combining a job generation application, a job management server, an electrophotographic printer, and ink jet is suitably developed in an image forming system. In the POD environment, delivery of various kinds of jobs in small lots is demanded in short delivery time. An image forming system that performs workflow processing is discussed by Japanese Patent Application Laid-Open No. 2007-304814.

A job definition format (JDF) is known as a standard format specification that defines jobs and communication thereof in a POD printing workflow. An image forming system based on the JDF specification manages printing costs by using a server application called a Management Information System (MIS). A job defined by JDF data will be referred to as a JDF job below.

The MIS collects not only information about consumables such as sheet and toner concerning each JDF job, but also information about actual working hours of operation performed by a worker in an image forming apparatus as cost information of human resources. Work performed by a worker includes information registration about and supply of consumables such as sheets and tint adjustment work in image processing.

Information about working hours collected by the MIS is used as a standard index to calculate a cost estimate by checking against print requirements in a printing company. Since the estimated value calculated based thereon significantly affects order competitiveness, it is very important to correctly measure costs actually required for printing.

On the other hand, some image forming apparatuses that perform print processing have an authentication function that prevents a worker from making prints unless the worker logs in for printing. In such a case, the worker performs login processing by inputting preset user account information before starting printing using a user interface (UI) displayed in a panel on the image forming apparatus and does printing work after user authentication is carried out. Then, after the print processing is completed, the worker performs processing for logging out. With this function, it becomes possible to record which worker has performed login and logout processing at what time in the image forming apparatus.

Processing for transmitting working hour information during printing from an image forming system to MIS in the image forming system will be described below.

First, a prepress application configuring the image forming system creates JDF data and transmits the JDF data to the image forming apparatus. The worker performs login processing on a panel of the image forming apparatus when starting work. Then, the worker being logged in onto the image forming apparatus starts some work concerning processing based on a JDF job. The image forming apparatus analyzes the received JDF job to perform print processing or the like. The image forming apparatus manages the timing of logout, records information about working hours of the worker as log information, and notifies the MIS of the log information.

In the MIS, on the other hand, it is desirable to manage content of operations performed by the worker in the image forming apparatus and man-hours thereof in association with JDF jobs. However, there are examples (1) to (4) below in which it is difficult to manage work done by the worker concerning processing based on each JDF job in the image forming apparatus and actual working hours thereof in association with each JDF job in a management system using MIS.

(1) When Print Image Data is Captured by Scanning

An image may be used as a print content image when a printed sheet document is used as an original or by scanning hand-written data. As the workflow, document scanning is performed in the image forming apparatus, but scanning work and a JDF job related thereto are not conventionally associated with each other. As a result, the MIS cannot manage man-hours of the scanning work by associating them with the JDF job.

(2) When Sheet Information is Registered

The worker may perform setting/registration work of information about sheets used for JDF jobs in the image forming apparatus. If such registration work is not performed during print processing, more specifically, the registration work is performed before the image forming apparatus receives a JDF job, the image forming apparatus does not manage the JDF job to be associated with man-hours necessary for the registration work. As a result, it is difficult for the MIS to manage man-hours necessary for sheet registration work by associating them with JDF jobs in such an environment.

Assume a case in which when a job A is being processed in an image forming apparatus, sheet registration work of another JDF job (job B) is performed to enhance working efficiency of the worker. Since man-hours of the sheet registration work used in the job B are mixed with an execution time of the job A, the MIS may not be able to manage correct man-hours.

(3) When Sheets are Supplied or Exchanged

If the worker supplies sheets during printing of a JDF job, it is desirable to manage man-hours of the work as man-hours needed for the JDF job. However, if the worker exchanges or supplies sheets in advance before the image forming apparatus receives a JDF job, working hours needed for the work cannot be managed by directly associating them with the JDF job.

(4) Reprinting

If adjustment work such as setting work of the printing format is already done when an original JDF job is printed, no method of transferring man-hours thereof to a JDF job corresponding to reprinting is conventionally provided. More specifically, there may be fluctuations in man-hours between jobs even though the jobs are JDF jobs of the same content and are done by the same worker.

SUMMARY OF THE INVENTION

The present invention is directed to a mechanism capable of managing content and man-hours of various kinds of work processed by a job and performed by a worker on an image forming apparatus by appropriately associating them with the job.

According to an aspect of the present invention, an image forming apparatus provided with a storage apparatus to perform processing specified by a job received from outside, including: an operation log recording unit configured to record an operation log based on operations concerning work performed on the image forming apparatus, in the storage apparatus; a reception unit configured to receive the job from the outside; a processing unit configured to perform the processing specified by the job received by the reception unit based on the work performed on the image forming apparatus; a job log recording unit configured to record a job log based on the job processed by the processing unit, in the storage apparatus; a management unit configured to identify the operation log which is based on the operation corresponding to the job processing performed by the processing unit and concerning the work performed on the image forming apparatus, and is recorded in the storage unit, and to manage the operation log in association with the job; and a notification unit configured to make a notification based on the operation log and the job log associated by the management unit and recorded in the storage apparatus, to an external apparatus, wherein the management unit manages the job received by the reception unit and the operation log recorded in the storage apparatus before the job is received by the reception unit, by associating the job and the operation log with each other, and the operation log contains information about an operator who performed the operation and time information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating an association between a print log and JDF by an MIS server.

FIGS. 8A and 8B are flow charts illustrating a data processing procedure for the image forming apparatus.

FIG. 14 is a diagram illustrating processing to associate a log ID and JDF by the MIS server.

DESCRIPTION OF THE EMBODIMENTS

Figure 1:
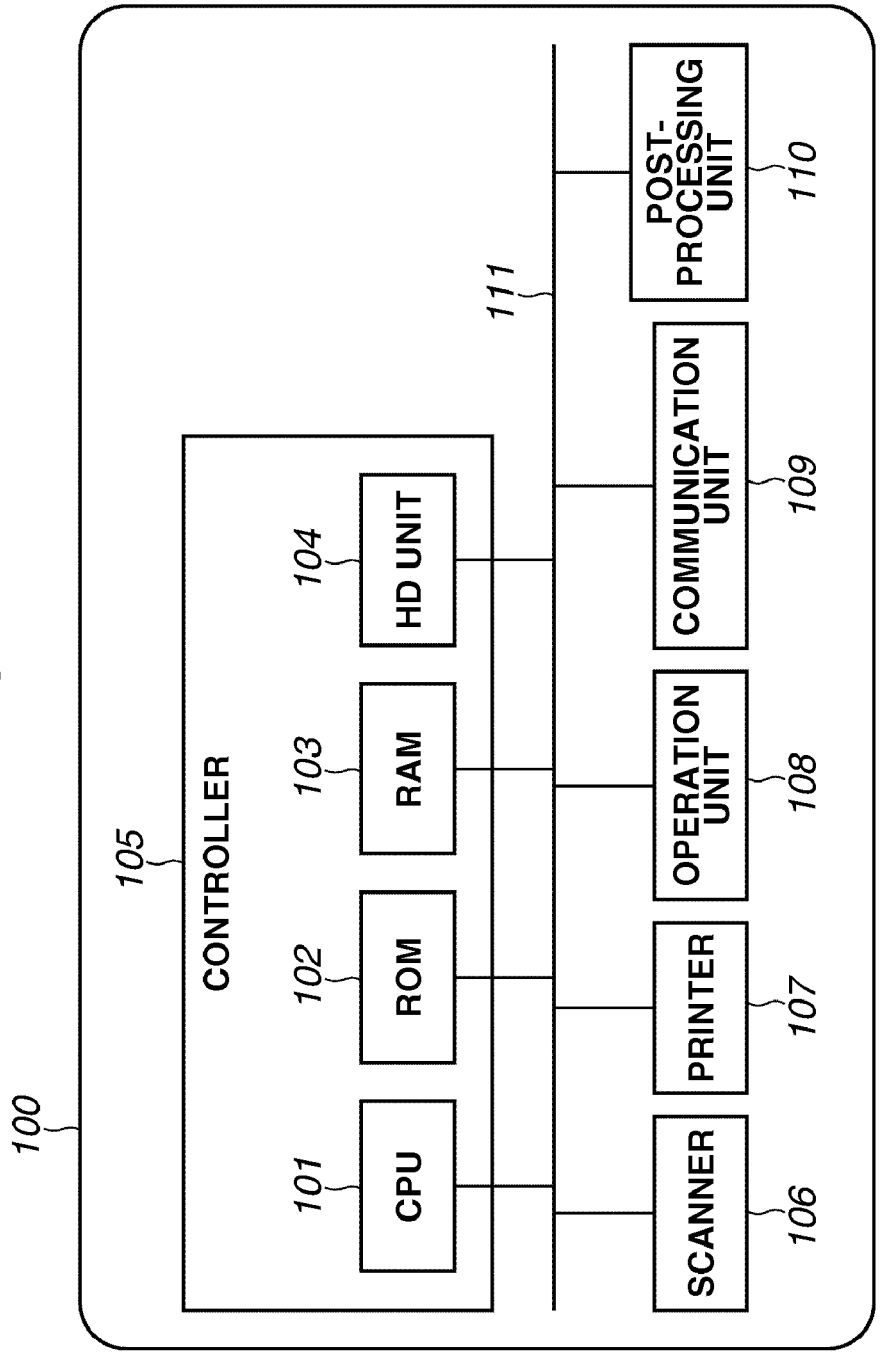
FIG. 1 is a block diagram illustrating a configuration of an image forming apparatus.

FIG. 1 is a block diagram illustrating the configuration of an image forming apparatus 100 applied to an image forming system according to a first exemplary embodiment. In this example, the image forming apparatus includes a Multi Function Peripheral (MFP). The MFP includes a reading unit such as a scanner, a printer unit, and a communication processing unit and performs processing of a plurality of functions such as copying, printing, and scanning. The image forming apparatus according to the present exemplary embodiment executes a series of workflow including image formation processing by applying image data of a document read by the reading unit to a JDF job received from a management apparatus according to instructions of the logging-in worker. In the present exemplary embodiment, particularly a POD system processing a JDF job is taken as an example.

In FIG. 1, a controller unit 105 controls the whole image forming apparatus. The controller 105 includes a central processing unit (CPU) 101, a read-only memory (ROM) 102, a random access memory (RAM) 103, and a hard disk unit (HD unit) 104.

Here, the CPU 101 is used to control the controller 105 and to perform arithmetic processing. The ROM 102 stores information such as a system booting program, which is loaded into the RAM 103 and executed by the CPU 101 to realize various kinds of functional processing. The RAM 103 is a data storage area without restrictions of use and is an area into which the operating system or a program of communication control or engine control is loaded for execution or which stores data.

A case where the HD unit 104 includes a hard disk will be shown, but instead of the HD unit 104 a nonvolatile storage device may be used such as a static random access memory (SRAM). Here, the HD unit 104 is used also as an area where log information of processing concerning JDF jobs received from an external apparatus is stored (for example, a workflow including document scanning and image formation processing). The log information enables, for example, recognition of a progress of work which a worker who logs in to an MFP has done until the worker logs out.

A scanner 106 functions as a reading unit and reads an image of a document set by the worker. Conditions for reading a document are assumed to be set by the worker using an operation unit 108.

A printer 107 performs a printing operation under the control of the controller 105. Printing methods include an ink jet method and an electrophotographic method. The image forming apparatus 100 includes a plurality of paper feeding units (not illustrated) to house sheets to be fed to the printer 107. Each paper feeding unit includes a sensor to detect whether the door is opened/closed, for example, when sheets are supplied. Thus, the exchange/supply time of sheets by the worker can be calculated by monitoring of output from the sensor by the CPU 101.

If the printer 107 adopts the electrophotographic method, printing is done using toner, which includes charged fine particles, which is transferred to a sheet by static electricity and fixed by a fixing device. The toner is in most cases configured by four colors of yellow, magenta, cyan, and black.

An operation unit 108 receives instructions from the user via a user interface or makes a display. A communication unit 109 exercises network communication control and can communicate with another image forming apparatus or a computer. A system bus 111 is a path of data among the above components. A post-processing unit 110 performs sheet processing. Here, the sheet processing includes processing needed after printing such as saddle stitching, cutting, punching, and casing.

Figure 2:
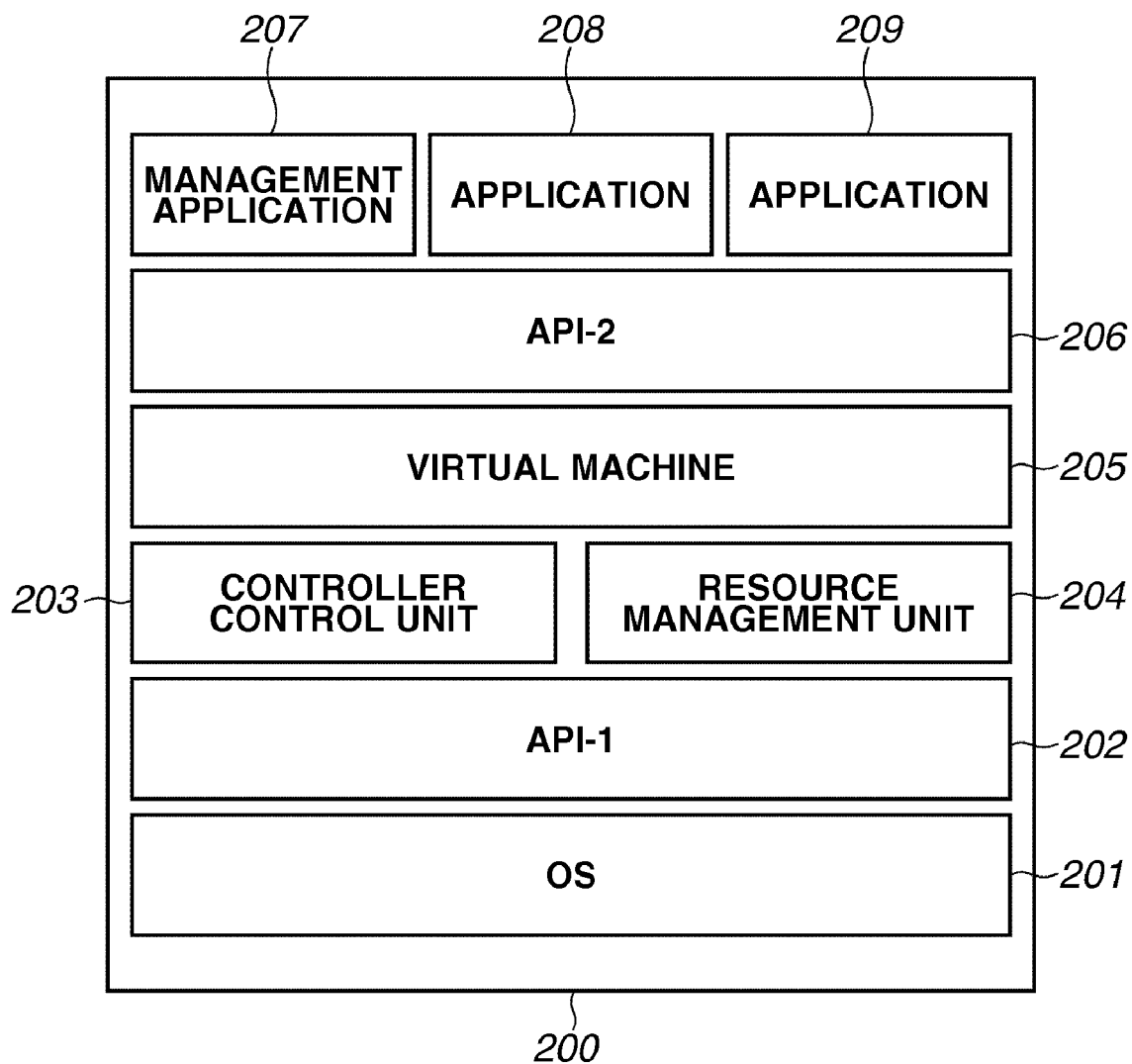
FIG. 2 is a block diagram illustrating a software configuration of the image forming apparatus.

FIG. 2 is a block diagram illustrating a software configuration of the image forming apparatus 100 illustrated in FIG. 1. Software described below is stored in the ROM 102 or the HD unit 104 and loaded into the RAM 103 for execution by the CPU 101 when the image forming apparatus 100 is started.

In FIG. 2, an operating system (OS) 201 manages/controls resources of the whole image forming apparatus 100. An API-1 (first API) 202 is an interface for applications running on the OS 201. An application 208 can access resources in the image forming apparatus 100 through the first API 202 or execute commands by the CPU 101.

A controller control unit 203 runs on the OS 201 to control the scanner 106, the printer 107, and the operation unit 108. A resource management unit 204 restricts usage of resources to a predetermined level when the controller control unit 203, a virtual machine 205 described below, or all applications on the virtual machine 205 use resources such as a memory.

A virtual machine 205 is an optimal execution environment for executing specific applications and is realized by, for example, a virtual machine of Java (registered trademark).

An API-2 (second API) 206 is an interface for applications running on the virtual machine 205 to use the controller control unit 203, the resource management unit 204, and the first API 202.

A management application 207 manages applications running on the virtual machine 205. The management application 207 downloads, uploads, deletes, and enables/disables the application 208 described below. The management application 207 is one of applications running on the virtual machine 205.

The image forming apparatus 100 is configured to be able to install and operate any number of applications having any function which performs a role expected from the image forming apparatus 100 in the present exemplary embodiment.

Figure 3:
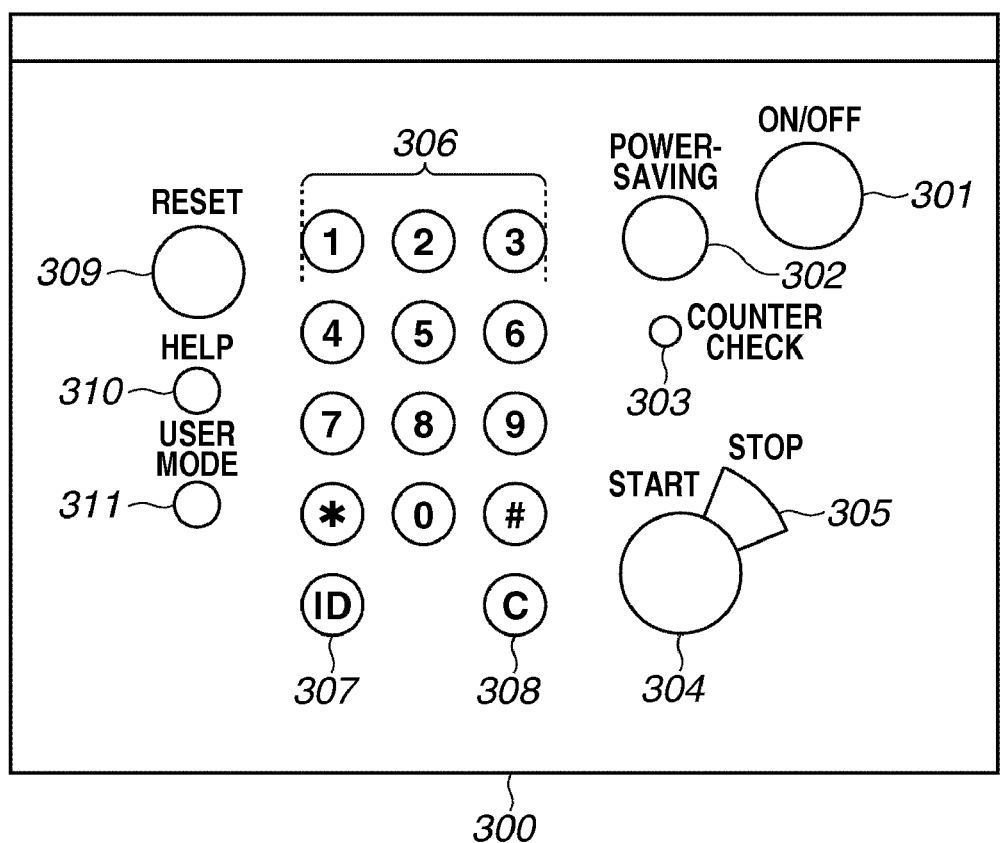
FIG. 3 is a plan view illustrating hard keys of an operation unit.

FIG. 3 is a plan view illustrating hard keys of the operation unit 108 illustrated in FIG. 1.

In FIG. 3, a key input unit 300 can receive a user's operation through hard keys. A power switch functions as an ON/OFF button. When a power-saving button 302 is pressed, a transition to a power-saving mode occurs. The power-saving mode indicates a state in which power consumption by the whole apparatus is reduced by stopping power supply to a portion of components.

Figure 4:
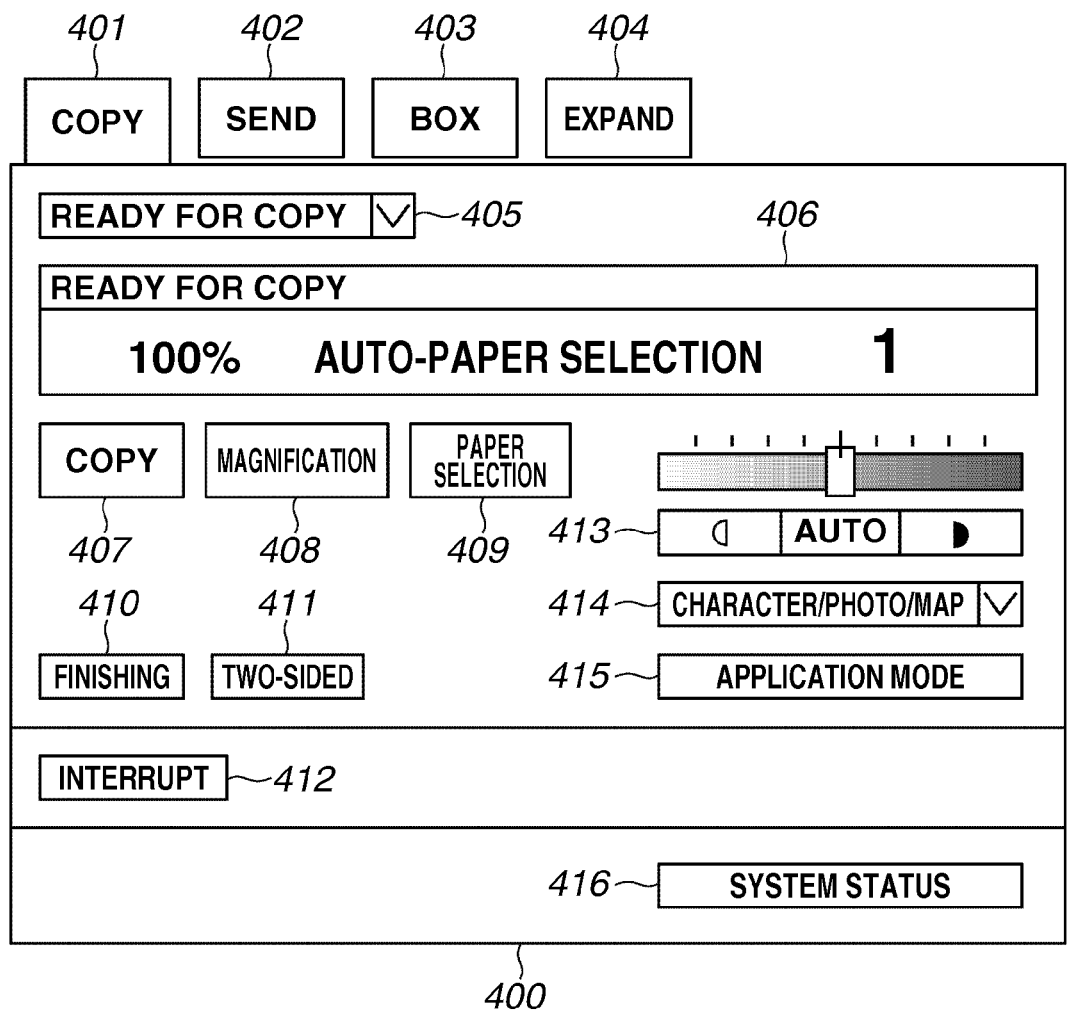
FIG. 4 is a diagram exemplifying a user interface displayed in the operation unit.

When a counter confirmation key 303 is pressed, information about billing counters is displayed in a touch panel 401 illustrated in FIG. 4. Information about billing counters includes counters of a total, black and white total, and color total and each counter value is managed by the controller 105. The total indicates the number of discharged sheets since the image forming apparatus 100 was installed. The black and white total is the number of black-and-white print sheets of the total and the color total is the number of print sheets other than black-and-white print sheets of the total.

A start key 304 instructs to start processing provided by the MFP such as copying, printing, scanning, and transmission. A stop key 305 instructs to stop a job started by the start key.

Ten keys 306 are used to input numeric information. An ID key 307 is used to instruct to input authentication information of the worker who logs in.

A clear key 308 cancels information input by the ten keys 306. A reset key 309 resets all parameters instructed by the user for the job to be processed. A help key 310 is pressed by the user to know how to operate the image forming apparatus 100 and displays information that will assist the worker in operating the image forming apparatus 100. A user mode key 311 is used to start various settings.

FIG. 4 is a diagram exemplifying the user interface displayed in a touch panel of the operation unit 108. The touch panel according to the present exemplary embodiment is provided with a display function and is also configured to be able to receive input from an operator by detecting whether a display area is pressed. The screen, as an example, corresponds to a screen displayed on the touch panel when the image forming apparatus 100 becomes operable.

In FIG. 4, a copy button 401 is a button to be pressed when a copying operation is performed. A send button 402 is a button to be pressed when transmission processing is performed. A box button 403 is a button to be pressed when processing is performed concerning a box that is mainly a storage area for image data provided in the image forming apparatus 100. An expansion button 404 is a button to be pressed when the screen of the application 208 is displayed.

A color selection list box 405 is used to select one of Auto selection, Color, and Black and white. A status display column 406 displays information to be communicated to the user. In FIG. 4, whether a copy can be made, the magnification, the sheet selection method, and the number of copies are displayed as an example.

A copy button 407 instructs a direct copy (magnification: 100%). A button 408 specifies the magnification. A sheet selection button 409 specifies from where sheets should be fed. A finish button 410 specifies setting content such as a sort setting and finishing setting.

A two-sided button 411 specifies whether one side or two sides should be used for each of document scanning and printing. An interrupt button 412 interrupts the job currently being performed to enable loading of a new job.

A slide bar 413 adjusts the density and specifies the printing density. Reference numeral 414 is used to specify characteristics of document scanning and enables switching between characters and photos, for example. An application mode button 415 is operated by the worker when complicated instructions are provided such as image adjustments, settings of the cover and inserting sheet, designation of bookbinding, setting of OHP pointing, and size of binding margin.

A system status display button 416 is pressed when conditions of each component configuring the image forming apparatus 100 or job history information recorded in the image forming apparatus 100 should be displayed.

Figure 5:
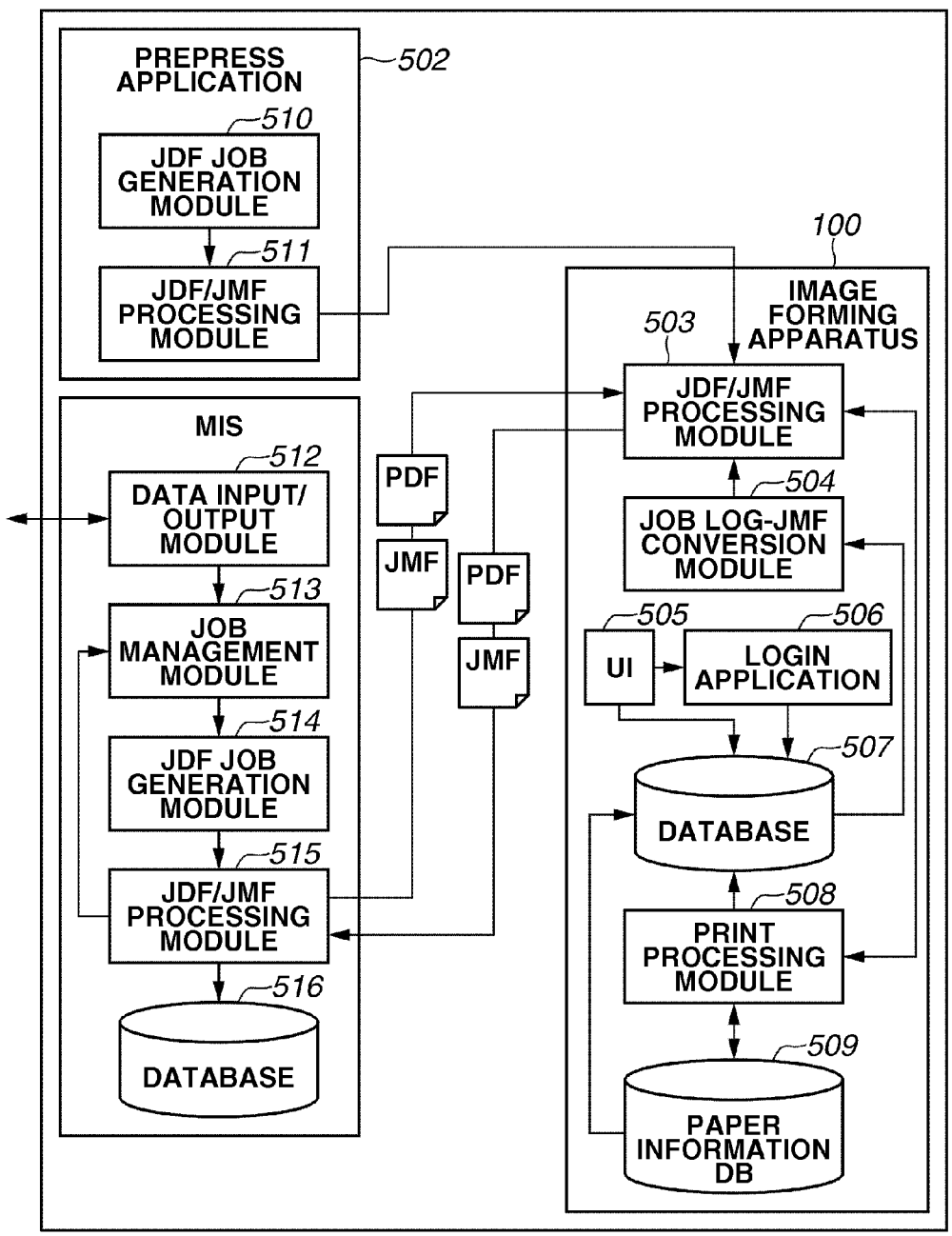
FIG. 5 is a block diagram illustrating the configuration of an image forming system.

FIG. 5 is a block diagram illustrating the configuration of an image forming system according to the present exemplary embodiment. This example is a system example in which an MIS server 501 as a management apparatus is connected to the image forming apparatus 100 via a network. The MIS server 501 is an information processing apparatus including a general personal computer and is provided with a controller unit (CPU) that exercises control of various memories and program execution. The MIS server 501 also includes an input apparatus and an output apparatus including a display unit and can display data processing results in the display unit by executing applications.

In FIG. 5, the image forming apparatus 100 includes a module to process a JDF job received from the MIS server 501. In the present exemplary embodiment, the MIS server 501 manages man-hours related to a JDF job transmitted to the image forming apparatus 100 according to a job messaging format (JMF) message notified from the image forming apparatus 100. The JMF message is data of JDF specification and exchanges job states, processing results, and operator information between apparatuses. In an image forming apparatus, a JMF message is generated based on JDF data and information about processing performed by the image forming apparatus. The MIS server 501 is assumed to be provided with a function to collect JMF messages containing man-hour information from the image forming apparatus 100 for use in calculating costs or the like.

The MIS server 501 functions as a system server to collect/analyze information necessary for decision making such as corporate management or business management, which is termed a management information system or management control system. Generally, the MIS server manages various kinds of information in a system that centrally manages various kinds of management information and sales information including advertisement, orders, estimates, planning, production, shipments, inventories, purchases, and sales. Particularly, the MIS server in the print industry performs unified management of print production facilities and print production resources and process control of the print production. Further, the MIS server can provide a mechanism to automate the total workflow from orders to delivery, or cost recovery. The JDF job includes JDF data, which is definition information of a job such as work instructions and print settings and print data.

The MIS server 501 issues the JDF data containing work instructions for each process in a POD site environment based on instructions concerning print content or the like from an end user. The image forming apparatus configured by a computer and various image forming apparatuses performs processing according to description of the JDF data.

The MIS server 501 exchanges messages termed JMF with each apparatus such as the image forming apparatus 100, which takes charge of each process in the POD site environment. The MIS server 501 uses JMF to acquire function information and capability information held by each apparatus, status information of each apparatus, and progress information of a job to manage the workflow of the system in a unified manner.

In an information processing apparatus 502, a prepress application which creates a JDF job operates. Functional modules of the prepress application include a JDF generation module 510 and a JDF/JMF processing module 511.

In the JDF generation module 510, a JDF job is generated from print content specified by the user. At this point, a portable document format (PDF) of Adobe or the like is used as actually printed content data. The JDF/JMF processing module 511 transmits/receives JDF/JMF to/from an external apparatus and performs parsing processing. A JDF job based on JDF data generated by the JDF generation module 510 is transmitted to the image forming apparatus 100 via the JDF/JMF processing module 511.

A JDF/JMF processing module 503 transmits/receives JDF/JMF and performs parsing processing. For example, the JDF job received here is transmitted to a print processing module 508 according to instructions of JDF data for print processing. After the print processing, the MIS server 501 is notified of a JMF message recording a printing result.

A JMF generation module 504 converts log information corresponding to processing based on the JDF job into the JMF format. JMF may be generated by adding a processing result, man-hours, or worker information such as a log to JDF data.

A UI 505 for display and input is provided in the image forming apparatus. A log-in management application 506 (log-in application) performs authentication processing when a worker performs log-in or log-out processing. A database 507 stores various kinds of information such as log information corresponding to processing based on the JDF job. A log containing work content and working hours of workers monitored as logging in by the login application 506 is recorded here in the database 507.

In the present exemplary embodiment, a work log is stored in the database 507 by associating the JDF job based on job log recording processing, and each piece of work done in the image forming apparatus by the worker. The work log based on operation log recording processing contains work content such as reading a document by the worker, work to make print settings of a job, registration/setting of the sheet type and the like, and sheet supply and working hours. The worker uses the operation unit 108 to make settings to apply image data read by the scanner 106 to a JDF job received from outside (such as the MIS server 501). While details thereof will be described below, reading a document and making print settings may be done by different workers when image data read by the scanner 106 is applied to a JDF job.

A print processing module 508 exercises control so that print processing corresponding to JDF data settings or work done by the worker is performed by the printer 107. A printing result here will be recorded in the database 507 as a log.

A sheet information database (sheet information DB) 509 manages sheet information registered in the image forming apparatus.

A data input/output module 512 inputs/outputs data from/to the outside on the MIS server 501.

A job management module 513 manages jobs by associating content data such as PDF, and a JDF job on the MIS server 501. The job management module 513 is configured to be able to display printing costs or the like based on various kinds of information notified from the image forming apparatus 100 using, for example, a user interface illustrated in FIG. 7.

A JDF job generation module 514 generates the JDF job from print content specified by an end user or a worker in the MIS server 51. At this point, image data such as PDF managed by the job management module 513 is used as content data. A JDF/JMF processing module 515 transmits/receives JDF/JMF and performs parsing processing. The JDF/JMF processing module 515 parses a JMF message received from the image forming apparatus 100 to acquire information such as man-hours, which is recorded to correspond to a specific JDF job.

A database 516 records and manages information such as man-hours based on processing of the JDF job by associating it with the JDF job.

FIG. 6 is a diagram exemplifying an association between each log contained in log information based on print processing or the like managed by the MIS server 501 illustrated in FIG. 5 and a JMF message. Information about man-hours in the JMF message is represented by an AuditPool tag. The JMF message is generated in such a way that the JMF message corresponds to each of processing content described in JDF data.

Start time 601 is start time of print processing by an operator 1 (worker) recorded in a log of ID0004. End time 602 is end time of the print processing by the operator 1 recorded in a log of ID0006. A difference between the two times represents a time needed for the print processing work.

Figure 7:
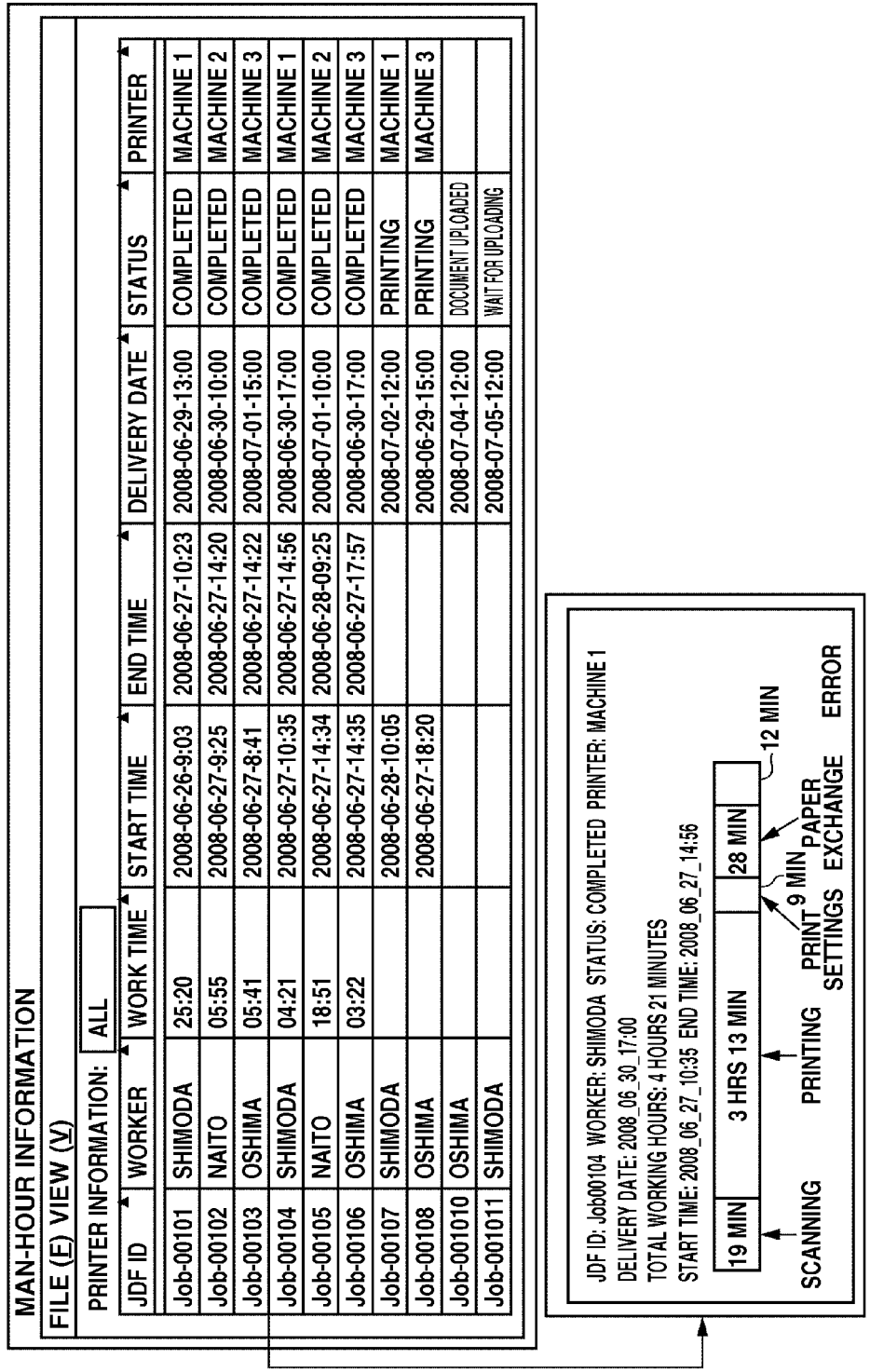
FIG. 7 is a diagram exemplifying a display screen of man-hours on the MIS server.

FIG. 7 is a diagram exemplifying a display screen of various kinds of information such as man-hours on the MIS server 501.

In FIG. 7, various kinds of information corresponding to each JDF job are displayed. Here, the JDF ID, which is information to uniquely identify the JDF job, is displayed. In addition, information such as the worker, working hours, start time of the work, end time of the work, delivery date of the work, a current processing state, and a printer performing processing based on a JDF job is displayed as display content. Detailed information about each job can further be displayed in response to instructions from a reader of each displayed information. As detailed information illustrated in FIG. 7, the breakdown by each piece of work in the total working hours of the job whose JDF ID is 00104 is displayed.

A tabulation processing result corresponding to a JMF message acquired from the image forming apparatus 100 as illustrated in FIG. 7 is tabulated and managed by the job management module 513 of the MIS server 501.

In the present exemplary embodiment, for example, a scan job performed by the image forming apparatus 100 that may be performed before a JDF job is received and the received JDF job are associated with each other. Further, man-hours that are not conventionally managed such as registration of the sheet type in the image forming apparatus 100, settings to associate the paper feeding unit with the sheet type, and sheet exchange by the worker are associated with one JDF job. By associating such work with the JDF job generated in response to one request and managing the associated work, it becomes possible, for example, to correctly manage man-hours of a sequence of work needed for some request and to reflect the man-hours in cost calculation.

In an actual workflow, scan work, registration work of the sheet type, and setting work for printing may be done by different workers. Work content and worker information are contained in a JMF message notified from the image forming apparatus so that the MIS server 501 can manage a worker who does each work of one JDF job. FIG. 7 described above illustrates an example in which each job is performed by one worker. In FIG. 7, if each work process is further performed by a plurality of workers, information thereof can be displayed. Then, details can be displayed in such a way that a worker who has done each work process or a portion of work content can be made recognizable by color coding or the like. Accordingly, the administrator who carries out information analysis on the MIS server 501 can easily analyze working efficiency and the aptitude of each worker.

An example of the processing that associates a scan work process in an image forming apparatus with a job will be described below using a flow chart illustrated in FIG. 8.

The scan work process exemplified in FIG. 8A is a process that is carried out when a sheet document is used as an original or image data obtained by scanning a hand-written document is used for actual print content, and is performed by a worker. Each step described below will mainly processed by the CPU. More specifically, each step described below will be realized by a program loaded into the RAM and executed by the CPU of the image forming apparatus 100.

In step S801, the CPU performs scan processing of a document set to the scanner in the image forming apparatus 100 according to instructions from the UI 505 by the worker who has performed login processing. If there is a plurality of documents, image data is read while the documents on the scanner is being changed. The worker can input the ID, name, and storage destination (such as a folder name) of image data via the UI 505 of the image forming apparatus to arrange the read image data.

Next, in step S802, after the scan work is completed, the CPU performs calculation of working hours from a difference between the start time and end time of the work and records the calculated working hours. The number of scanned documents, read image data, and worker information and working hours are associated with each other according to a scan log or operation log, which will be managed as a scan work process log. The worker performs logout processing to terminate the present processing.

The work process such as receiving a JDF job and actual print processing will be described using FIG. 8B.

In step S803, the JDF/JMF processing module 503 determines whether any JDF job has been received from the MIS server 501 or the prepress application. If the JDF/JMF processing module 503 determines that no JDF job has been received, the JDF/JMF processing module 503 repeatedly determines whether any JDF job has been received waiting until a JDF job is received. If the JDF/JMF processing module 503 determines that a JDF job has been received, the procedure proceeds to step S804.

In step S804, the JDF/JMF processing module 503 determines whether the JDF job received at S803 uses image data stored as content data scanned by the image forming apparatus 100. If the JDF/JMF processing module 503 determines that the JDF job does not use image data stored in the image forming apparatus 100, the procedure proceeds to step S805. On the other hand, if the JDF/JMF processing module 503 determines that the JDF job uses image data stored in the image forming apparatus 100 at S804, the procedure proceeds to step S807.

In step S805, the print processing module 508 controls print processing based on setting information contained in the JDF job and content data. In step S806, the CPU calculates working hours needed for the print processing and records the working hours as a log by associating them with the received JDF job together with processing results.

In step S807, the JDF/JMF processing module 503 determines whether the ID of image data to be used for the JDF job is specified. If the JDF/JMF processing module 503 determines that the ID of image data for the JDF job is specified, the procedure proceeds to step S809. On the other hand, if the JDF/JMF processing module 503 determines that the ID of image data for the JDF job is not specified, the procedure proceeds to step S808.

In step S808, the CPU displays the UI in which the worker specifies any image data to be used as content data of the JDF job. Here, the worker refers to image data displayed in the UI and managed by the image forming apparatus to specify the use of any image data as content data. Moreover, the worker can specify the use of image data obtained by newly performing scan work in this timing from the UI. At this point, similarly to S802 described above, a log of working hours or the like is recorded. After the image data to be used as content data of the JDF job is specified, the procedure proceeds to step S809.

In step S809, the print processing module 508 controls the print processing using the specified image data as content data and based on the JDF job. The image data specified by the ID in the JDF job is read and used or the image data specified by the worker at step S808 will be used.

In step S810, the CPU calculates working hours needed for the print processing and records the working hours as a log by associating them with the received JDF job together with processing results. Then, in step S811, the JDF/JMF processing module 503 associates the log containing working hours needed to acquire image data recorded in step S802 or S808, with the ID of the received JDF job for management.

Here, not only man-hours of each work process, but also work content performed and results thereof will be associated and managed. Further, the JMF generation module 504 generates a JMF message based on a log of the scan work or print processing associated as a sequence of man-hours of the JDF job. Then, the JDF/JMF processing module 503 transmits the JMF message generated by the MIS server 501. Thereafter, the present processing is terminated. The JMF message may be transmitted immediately after processing of the JDF job is completed or acquired periodically by the MIS server 501.

Figure 9:
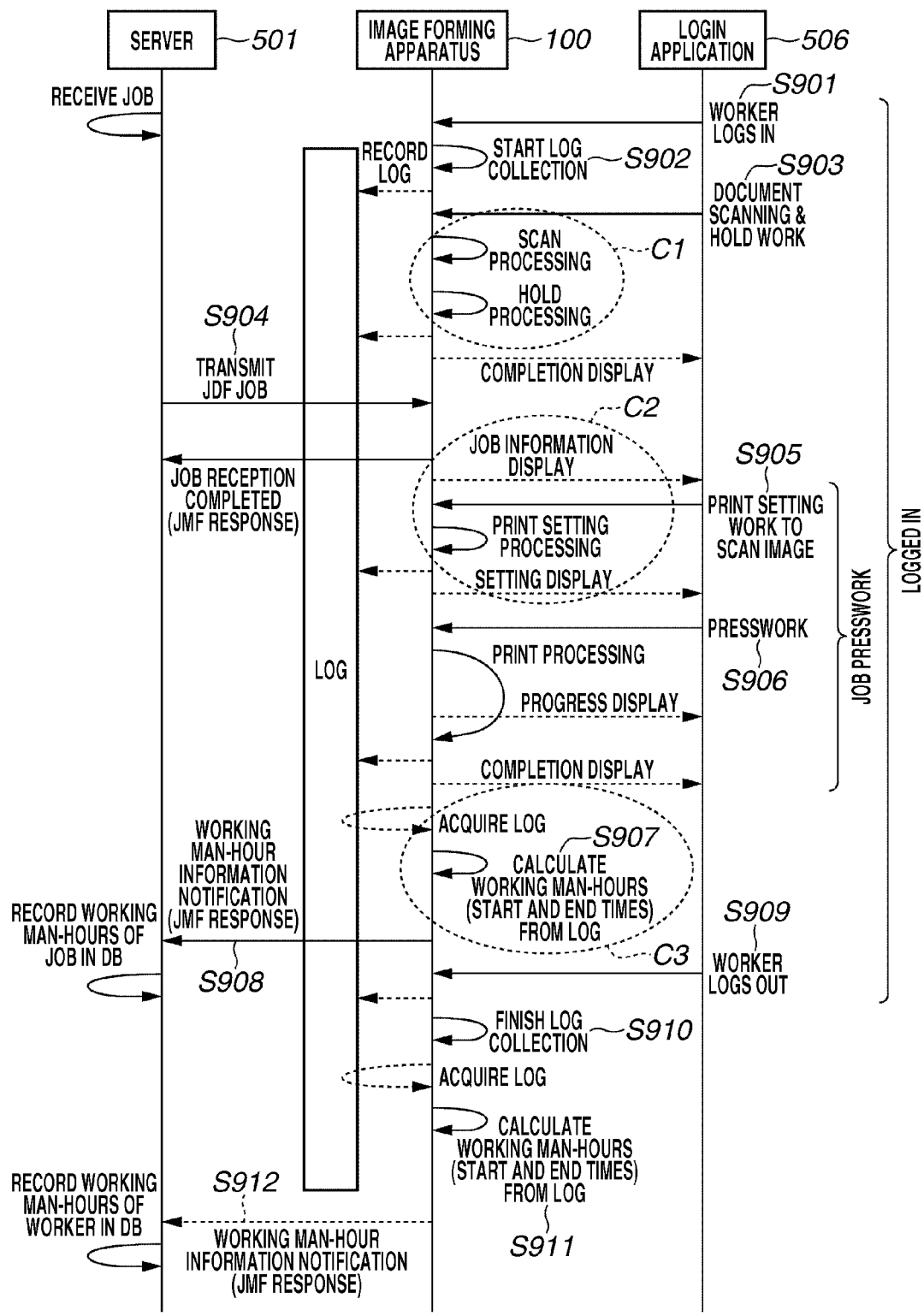
FIG. 9 is a diagram illustrating a workflow of the image forming system.

FIG. 9 is a diagram illustrating a sequence of workflow of one JDF job of an image forming system according to the present exemplary embodiment. More specifically, the flow of processing by the MIS server 501, the image forming apparatus 100, and the login application 506 will be described.

This example is a case where the worker who gives an instruction for scan work and the worker who gives an instruction for presswork are the same. In FIG. 9, a sequence of processing enclosed by C1 is a scan work process. Here, how to process image data of a scanned document, in other words, whether to apply the image data to a received JDF job is not set. A sequence of processing enclosed by C2 is a process to set the image to be used as content data, to the JDF job. Here, the worker makes settings whether to apply image data stored in the image forming apparatus 100 or the like. Further, calculation of man-hours from a log concerning presswork is carried out according to the log by a sequence of processing enclosed by C3.

In step S901, the login application 506 displays a login UI in the operation unit 108 to receive login processing by the worker. The period until the worker logs out of the image forming apparatus 100 in step S907 is monitored by the image forming apparatus 100 as a login period. In addition to a job log corresponding to a scan job or a JDF job, an operation log recording UI operations by the worker and operations such as opening/closing the paper feeding unit and time taken by the operations are recorded during the logging-in. The operation log also contains information about the worker.

Next, in step S902, the image forming apparatus 100 starts collection of logs about work done by the logging-in worker. Collected logs are stored and managed by the database 507. In step S903, when the worker gives an instruct for scan work of a document using the UI displayed in the operation unit 108, the scanner 106 performs the scan work of a document. A log concerning the scan work process is recorded in the database 507. Image data scanned here is held (primary recorded) in a predetermined storage area of the image forming apparatus 100.

Then, in step S904, the image forming apparatus 100 receives a JDF job from the MIS server 501 or the prepress application. The image forming apparatus 100 transmits a response indicating completion of job reception to the MIS server 501.

Next, in step S905, the image forming apparatus 100 displays a UI to make settings to associate the received JDF job and the scanned image data with each other, in the operation unit 108. The worker uses the UI to specify the use of the image data scanned in step S903 as content data of the received JDF job to provide print instructions. Then, in step S906, the printer 107 performs print processing. The progress while the print processing is performed is displayed on the image forming apparatus 100 and when printing is completed, a notification of completion is displayed.

In step S907, the image forming apparatus 100 acquires log information concerning the print processing recorded in the image forming apparatus 100 to calculate man-hours needed for the print processing. Also, the image forming apparatus 100 searches for a log of the work process when image data used for the print processing is scanned to associate the log with the job ID of the JDF job. In step S908, the image forming apparatus 100 notifies the MIS server 501 of a response indicating completion of printing. At this point, man-hours of the print processing based on the JDF job are also notified.

In step S909, the login application 506 detects logout processing of the worker and in step S910, the image forming apparatus 100 terminates the collection of logs concerning work of the worker.

In step S911, the image forming apparatus 100 calculates man-hours of the worker concerning the JDF job from log information recorded in the database 507. Here, man-hours are calculated from man-hours of setting work in step S905, man-hours of the scan work process in step S903, and man-hours concerning the print processing. Associated work is identified based on the job ID associated by the log corresponding to each work, and work content.

In step S912, the image forming apparatus 100 notifies the MIS server 501 of man-hour information of the worker calculated in step S911.

Accordingly, the MIS server 501 can manage man-hours of the whole work corresponding to the JDF job involving a document scan operation by the worker. Correct printing costs can thereby be calculated.

Identification of a log of work by another worker of the print processing based on the JDF job and calculation of man-hours of the whole work performed by the image forming apparatus 100 may be performed by the MIS server 501. In that case, the MIS server 501 acquires log information from the image forming apparatus 100 in predetermined timing and performs the above processing described in steps S907 and S911.

Figure 10:
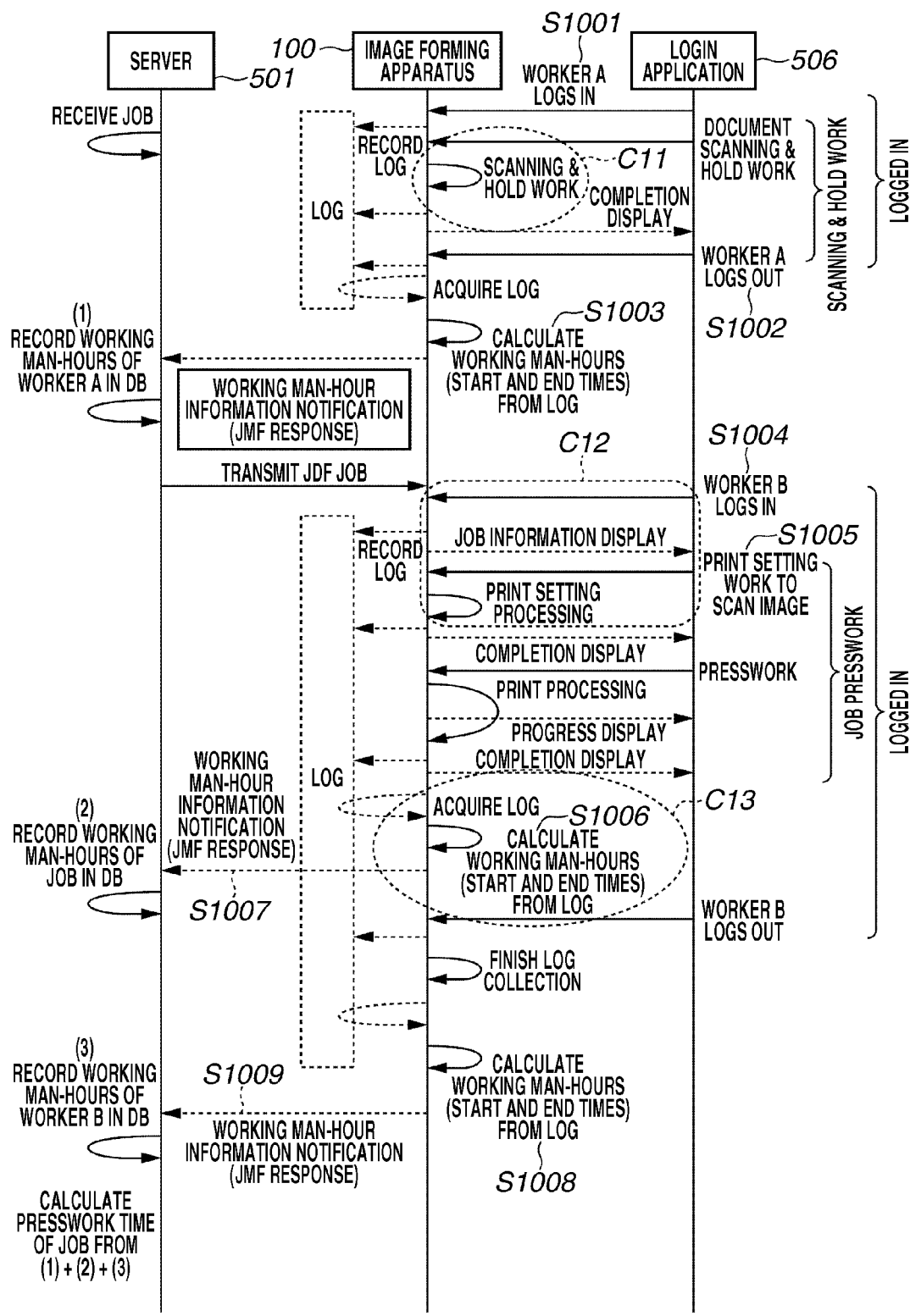
FIG. 10 is a diagram illustrating the workflow of the image forming system.

FIG. 10 is a diagram illustrating a sequence of workflow related to one JDF job of an image forming system, which is different from that in FIG. 9.

The workflow is characterized in that image data read by the scanner 106 of the image forming apparatus 100 according to instructions of a worker A is applied to a JDF job received from the MIS server 501 according to an instruction of another worker B for processing.

A sequence of processing enclosed by C11 is a scan work process by the worker A. Here, how to process image data of a scanned document, in other words, whether to apply the image data to a received JDF job is not set. A sequence of processing enclosed by C12 is a process to set the image to be used as content data to the JDF job by the worker B. Further, calculation of man-hours from a log concerning presswork is carried out according to the log by a sequence of processing enclosed by C13.

After login processing of the worker A in step S1001, the scanner 106 performs a scan work process just like in FIG. 9 and the login application 506 performs logout processing of the worker A in step S1002. At this point, the image forming apparatus 100 makes a record of log concerning the scan work. Then, in step S1003, the image forming apparatus 100 calculates man-hours concerning the scan work from the log. Then, the image forming apparatus 100 transmits a notification including the calculated man-hours, ID to identify the scanned image data, and information about the worker A, to the MIS server 501.

At this point, man-hours of scan work managed by the MIS server 501 are not associated with any JDF job.

Next, in step S1004, the worker B uses the UI provided by the login application 506 to perform login processing. Then, the login application 506 instructs to start printing by the worker B of the JDF job which is received by the image forming apparatus 100. In step S1005, the worker B make a setting to apply any image data to the JDF job from the UI of the image forming apparatus 100.

Here, it is assumed that the image data scanned in step S1001 is used as content data. The image data may be preset in the JDF job by using the ID to identify image data contained in a completion notification of scan work. Then, the print processing using JDF job settings or specified image data is performed by the image forming apparatus 100 and at the same time, a log is recorded in the database 507.

In step S1006, when the MIS server 501 is notified of completion of the print processing, the image forming apparatus 100 acquires log information concerning the print processing recorded in the image forming apparatus 100 to calculate man-hours needed for the print processing. Also, the image forming apparatus 100 searches for a log of the work process when image data used for the print processing is scanned to associate the log with the job ID of the JDF job. In step S1007, in addition to man-hours taken in the processing, the ID to identify image data used as content data is transmitted to the MIS server 501 as a JMF message which is notified to the MIS server 501.

In step S1008, the image forming apparatus 100 calculates man-hours of work in step S1005 concerning the worker B recorded in the log managed by the image forming apparatus 100 and in step S1009, transmits work content concerning the worker B, man-hours, and information about the worker B to the MIS server 501.

The MIS server 501 that receives the message from the image forming apparatus 100 calculates overall man-hours of a sequence of work based on the JDF job by adding the illustrated man-hours (1)+man-hours (2)+man-hours (3) to manage the overall man-hours. Accordingly, the MIS server 501 can appropriately manage man-hours of processing the same JDF job, though performed by different workers in different timing, so that correct printing costs can be calculated.

Moreover, work content of each worker and man-hours needed therefor can be grasped on the MIS server 501 based on information about workers contained in a message notified from the image forming apparatus. This will be very important management information for optimal arrangement of workers such as work assignment that takes aptitude into consideration because this information enables one to analyze working efficiency of each worker.

Figure 11:
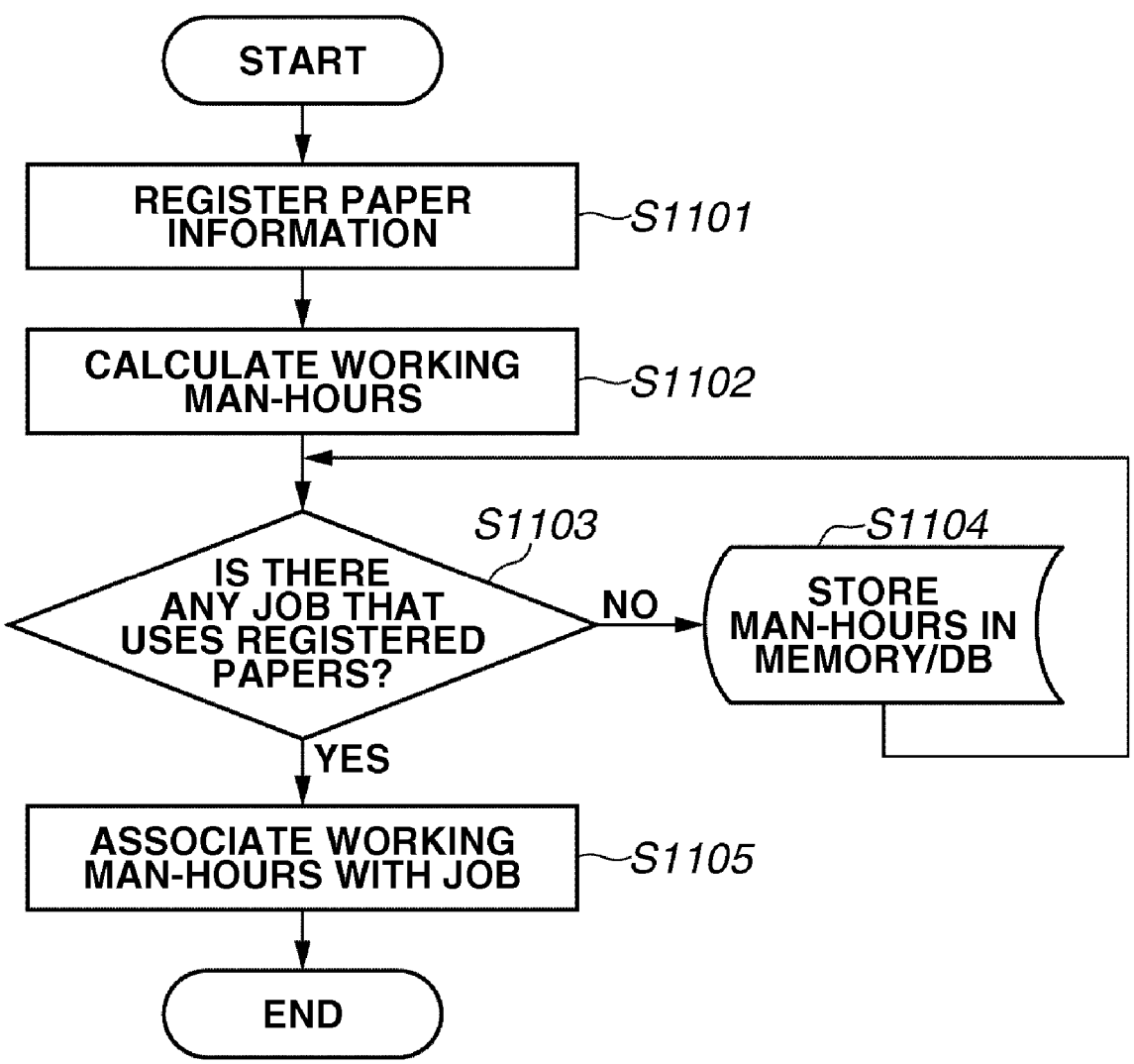
FIG. 11 is a flow chart illustrating the data processing procedure for the image forming apparatus.

The processing procedure for registration of sheet information in the image forming apparatus will be described using the flow chart illustrated in FIG. 11. Each step is realized by a program being loaded into the RAM and executed by the CPU of the image forming apparatus 100.

In step S1101, the CPU registers the specified sheet information in the database 509 according to instructions using the operation unit 108 of the image forming apparatus 100 of the worker. At this point, sheet information registered by the worker includes, for example, characteristic information of sheets such as the sheet name, sheet ID, sheet size, sheet weight, sheet thickness, sheet color, sheet type, sheet shape, sheet material, sheet surface property, and sheet permeability. Moreover, a paper feeding unit provided in the image forming apparatus 100 to which a sheet is set, and the sheet to be set may also be registered here.

Next, in step S1102, the image forming apparatus 100 calculates man-hours of the worker in registering sheet information. To calculate the man-hours, time until a button to complete sheet registration is pressed after the sheet registration screen is displayed, may be measured using a timer function of the image forming apparatus 100.

Next, in step S1103, the print processing module 508 determines whether there is any JDF job that uses the sheet information registered in step S1101, among received JDF jobs managed by the image forming apparatus 100. If the print processing module 508 determines that there is a JDF job that uses the registered sheet information, the procedure proceeds to step S1105. On the other hand, in step S1103, if the print processing module 508 determines that there is no JDF job that uses the registered sheet information, the procedure proceeds to step S1104.

In step S1105, the image forming apparatus 100 stores the job, work content thereof, working hours, and information about the worker in association with the database 507, by relating them to the job ID of the JDF job using the sheet information registered in step S1101. Further, the JDF/JMF processing module 503 transmits information about man-hours concerning registration work of sheet information held in the database 507 to the MIS server 501 before terminating the processing. Then, the processing ends.

In step S1104, since no job using the sheet information registered in step S1101 has been received, the image forming apparatus 100 stores work content concerning sheet registration work, man-hours, and information about the worker in the database of the image forming apparatus 100. At this point, the image forming apparatus 100 may transmit the information to the MIS server 501 as a notification of completion of the sheet information registration work.

With this processing, the MIS server 501 can hold and manage man-hours in registering the sheet information received from the image forming apparatus 100 and the like in the database 516.

As association processing in step S1105, all man-hours for registering sheet information are added to working hours corresponding to the job that first uses the sheet. If the sheet information registered by the registration work is used in any other job, man-hours needed for the sheet information registration work may be managed in such a way that the man-hours are not included in man-hours of the job. This is because jobs using sheets registered for the second time or later use sheet information already set and thus, no registration work is carried out by the worker.

Alternatively, all man-hours for registering sheet information may be divided over the presswork time of all jobs using the registered sheet. In this case, for example, the proportion of working hours of the sheet registration work to be included changes depending on the number of sheets used for the job.

Figure 12:
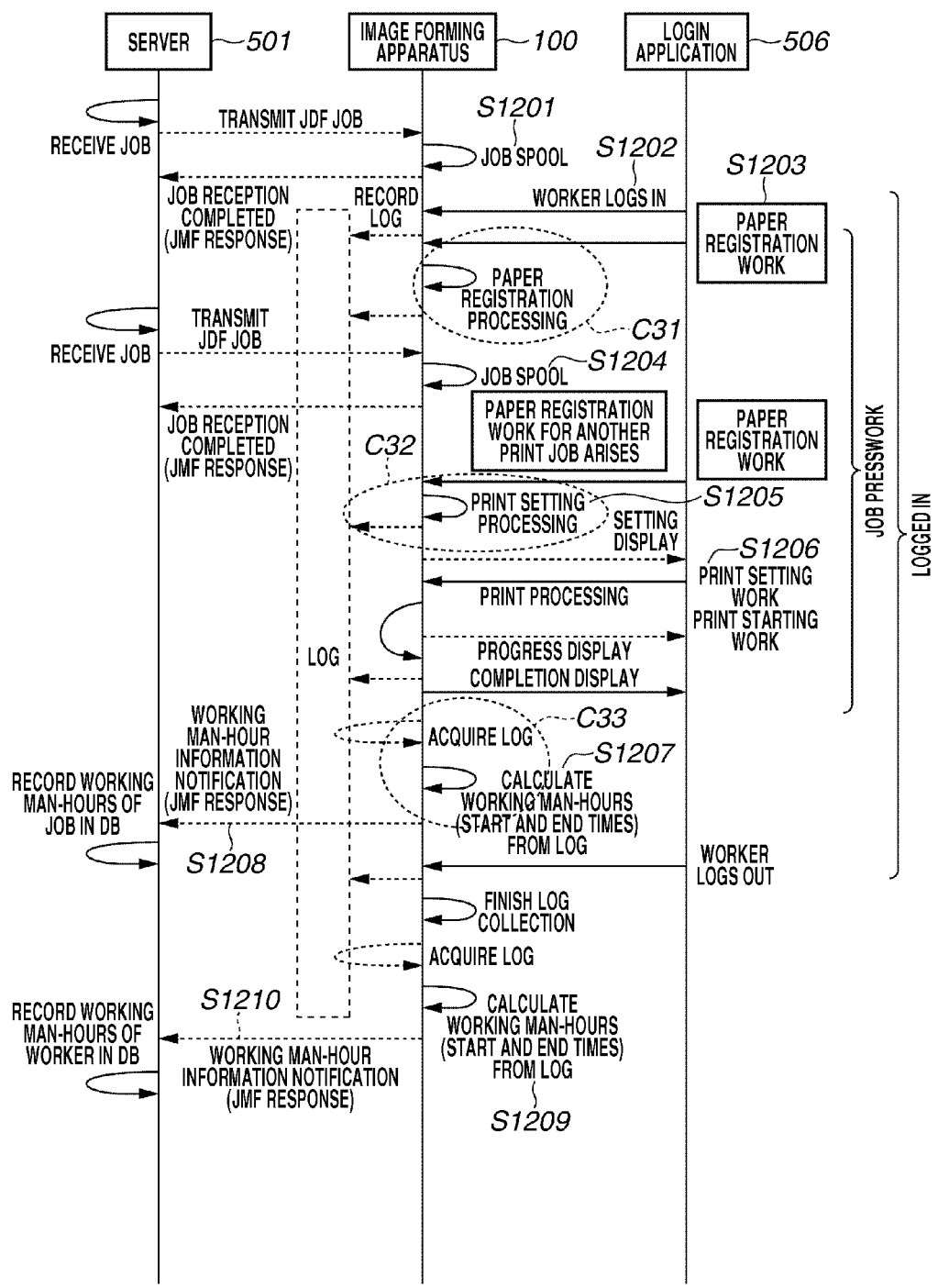
FIG. 12 is a diagram illustrating the workflow of the image forming system.

FIG. 12 is a diagram illustrating a sequence of workflow of one JDF job of an image forming system according to a second exemplary embodiment. More specifically, the flow of processing performed in the MIS server 501, the image forming apparatus 100, and the login application 506 will be described. This example is a sequence example when man-hours concerning registration work of sheet information are taken into account.

In FIG. 12, a sequence of processing enclosed by C31 is a registration work process of sheet information. A sequence of processing enclosed by C32 is a registration work process of sheet information that is not used by the JDF job currently being processed. Further, calculation of man-hours from a log concerning presswork is carried out according to the log by a sequence of processing enclosed by C33.

In step S1201, the image forming apparatus 100 receives a JDF job and spools the JDF job to, for example, the database 507 of the HD unit 104. Then, in step S1202, after the worker logs in to the image forming apparatus 100, in step S1203, the worker performs registration work of sheet information to be used for the job spooled in the HD unit 104 using the operation unit 108. The operation log concerning registration work of sheet information is recorded in the database 507 of the image forming apparatus 100. Further, the job that uses the registered sheet information is already managed by the image forming apparatus 100 and thus, a log concerning the registration work will be managed in association with the job ID.

Next, in step S1204, the image forming apparatus receives another JDF job. The received JDF job is spooled in the database 507 of the HD unit 104 of the image forming apparatus 100. Then, in step S1205, the worker performs registration work of sheet information for the other job by the operation unit 108 to use the job received in step S1204. The operation log concerning registration work of sheet information here is also recorded in the database 507 of the image forming apparatus 100.

Next, in step 1206, the worker starts the print processing of the job received in step S1201. The worker selects sheets to be used for the job or makes various settings concerning image formation as needed. Then, the print processing module 508 performs the print processing according to JDF job settings or operation content performed by the worker. The log concerning the print processing is also recorded in the database 507.

Next, in step S1207, the image forming apparatus 100 calculates working hours needed for the presswork based on the log. Then, in step S1208, the image forming apparatus 100 notifies the MIS server 501 of man-hours of the presswork.

In step S1209, the image forming apparatus 100 calculates man-hours of sheet registration of the worker logged in step S1203. In step S1210, the image forming apparatus 100 transmits information about the worker and the calculated man-hours to the MIS server 501. If jobs and work done by workers are associated with each other for management, the notification content here is to contain the job ID of the job.

Accordingly, the MIS server 501 can manage man-hours involved in registration work of sheet information by associating them with jobs.

Figure 13:
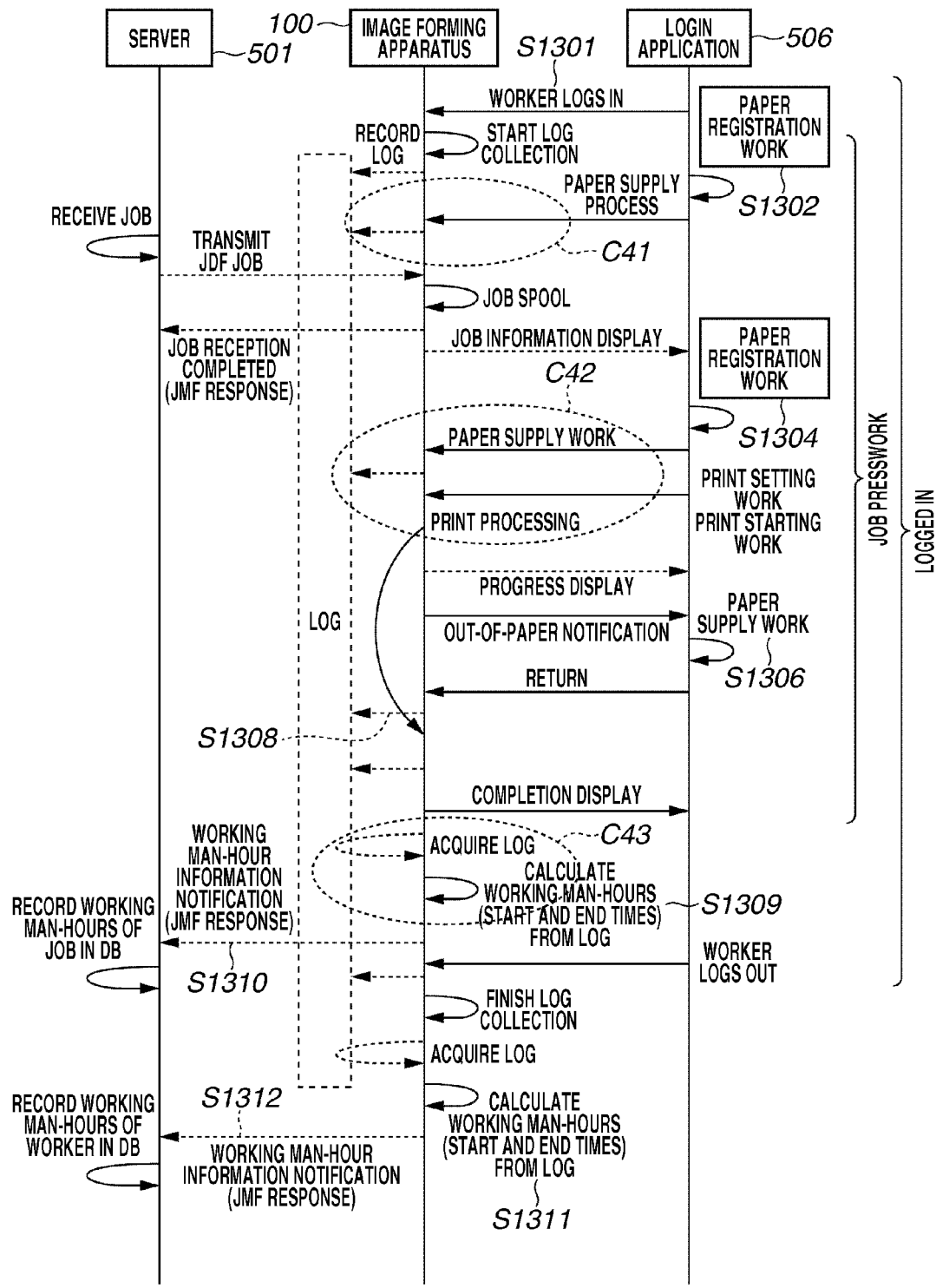
FIG. 13 is a diagram illustrating the workflow of the image forming system.

FIG. 13 is a diagram illustrating a sequence of workflow of one JDF job of an image forming system according to a third exemplary embodiment. This example is a sequence example when man-hours concerning supply work of sheets are taken into account.

In FIG. 13, a sequence of processing enclosed by C41 is a supply work process of sheets. A sequence of processing enclosed by C42 is a supply work process of sheets performed during the print processing. Further, calculation of man-hours from a log concerning presswork is carried out according to the log in a sequence of processing enclosed by C43.

In step S1301, after the worker moves into a login state using the operation unit 108, in step S1302, the login application 506 performs registration work of sheet information. Then, based on the registered sheet information, the worker supplies sheets to one of paper feeding units provided in the image forming apparatus. At this point, if it is known that, instead of sheets set to the paper feeding unit in advance, other sheets will be used for subsequent printing, the worker also exchanges sheets. Then, the image forming apparatus 100 records a log of these pieces of work done by the worker. The log contains information about the worker, information about the paper feeding unit used for the work, and working hours. The working hours are obtained by measuring time in which a sensor detects that the door of the paper feeding unit is opened/closed.

Next, in step S1304, the worker registers sheet information necessary for printing the received job spooled in the HD unit 104 of the image forming apparatus 100. Then, the worker supplies sheets to the paper feeding unit of the image forming apparatus 100 according to the registered information. The log of work concerning registration of sheet information and sheet supply is recorded in the database 507.

Printing based on the job is started and the worker is notified of shortage of sheets via the UI of the operation unit 108. In step S1306, the worker supplies sheets to the paper feeding unit where sheets have run out. In this case, in step S1308, the image forming apparatus 100 records the log concerning supply work of sheets by the worker in the database 507. At the same time, an error log concerning an occurrence of an sheet-out error and its recovery are recorded in association with the job ID.

In step S1309, the image forming apparatus 100 records a log concerning the print processing whose printing is completed and calculates man-hours of the presswork based on the log. Then, in step S1310, the image forming apparatus 100 transmits information about man-hours of presswork including the corresponding job ID to the MIS server 501 as a notification of printing completion. The image forming apparatus 100 associates the job ID with a log concerning work to supply sheets used here for the print processing. Accordingly, a log concerning operations performed by the worker before the job is received or the print processing is carried out, becomes manageable as a sequence of work based on a specific job.

Then, in step S1311, the image forming apparatus 100 calculates man-hours of the worker who has logged in step S1301. Here, man-hours of the registration work of sheet information, supply work of sheets, and setting work for printing are added. In step S1312, the image forming apparatus 100 transmits information such as the calculated man-hours, information about the worker, and the job ID to the MIS server 501. Accordingly, even if, for example, the worker supplies sheets before the image forming apparatus receives a JDF job, the MIS server 501 can manage man-hours by associating them with the JDF job.

In a fourth exemplary embodiment, man-hour control concerning a reprint processing in the image forming apparatus is described. The worker performs setting work of the printing format for an original job before giving instructions for reprinting. Another new log is generated in the image forming apparatus 100 when carrying out reprinting and at this point, the log and the job ID of the original job are associated with each other. Then, when the reprinting is completed, the image forming apparatus 100 transmits man-hours needed for the reprint processing and information such as the job ID of the original job to the MIS server 501.

Accordingly, the system administrator or the like can recognize that fluctuations in man-hours between jobs are caused by the reprinting when jobs have the same content, from information collected by the MIS server 501. Moreover, man-hours can appropriately be managed including a job in which the reprinting has been carried out.

FIG. 14 is a diagram illustrating a correspondence relationship between JMF messages and various kinds of log information managed by the MIS server 501 illustrated in FIG. 1. This example is an example of log information managed by the job management module 513 based on the JMF messages illustrated in FIGS. 9, 10, 12, and 13.

In FIG. 14, scan work by the worker in log IDs 0002 and 0003, sheet registration work by the worker in log IDs 0004 and 0005, and presswork by the worker in log IDs 0006 and 0007 are managed by associating them with JMF messages. JMF messages illustrated in this example show an example in which man-hour information is described in association with the work process by the AuditPool tag.

Each process of the present invention can also be realized by executing software (program) acquired via a network or various kinds of storage media in a processing apparatus (CPU, processor) such as a personal computer.

Other Embodiments

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-055014 filed Mar. 9, 2009, which is hereby incorporated by reference herein in its entirety.

What is claimed is:

1. An image forming apparatus including a storage device capable of performing processing specified by a job received from outside, comprising:
   an operation log recording unit configured to record an operation log based on operations concerning work performed on the image forming apparatus, in the storage device;
   a reception unit configured to receive the job from the outside;
   a processing unit configured to perform the processing specified by the job received by the reception unit based on the work performed on the image forming apparatus;
   a job log recording unit configured to record a job log based on the job processed by the processing unit, in the storage device;
   a management unit configured to identify the operation log which is based on the operation corresponding to the job processing performed by the processing unit and is recorded in the storage device, and to manage the operation log in association with the job; and
   a notification unit configured to make a notification based on the operation log and the job log associated by the management unit and recorded in the storage device, to an external apparatus,
   wherein the management unit manages the job received by the reception unit and the operation log recorded in the storage device before the job is received by the reception unit, by associating the job and the operation log with each other, and the operation log contains information about an operator who performed the operation and time information.

2. The image forming apparatus according to claim 1, wherein the work includes scan work,
   the processing unit performs the processing specified by the job received by the reception unit using image data scanned in the scan work, and
   the management unit identifies the operation log, which is based on the scan work that scans the image data used by the processing unit and is recorded in the storage device, and manages the operation log in association with the job.

3. The image forming apparatus according to claim 1, wherein the work includes registration work of sheet information,
   the processing unit performs the processing specified by the job received by the reception unit using sheets registered in the registration work of sheet information, and
   the management unit identifies the operation log based on the registration work of sheet information used by the processing unit and recorded in the storage device, and manages the operation log in association with the job.

4. The image forming apparatus according to claim 1, wherein the work includes supply of sheets,
   the processing unit performs the processing specified by the job received by the reception unit using sheets supplied by the supply work, and
   the management unit identifies the operation log, which is based on the supply work that supplies sheets used by the processing unit and is recorded in the storage device, and manages the operation log in association with the job.

5. The image forming apparatus according to claim 1, wherein the job is a JDF job.

6. A method for an image forming apparatus including a storage device capable of performing processing specified by a job received from outside, comprising:
   recording an operation log based on operations concerning work performed on the image forming apparatus, in the storage device;
   receiving the job from the outside;
   performing the processing specified by the received job based on the work performed by the image forming apparatus;
   recording a job log based on the processed job in the storage device;
   identifying the operation log which is based on the operation corresponding to the job processing and is recorded in the storage device, and managing the operation log in association with the job; and
   making a notification based on the operation log and the job log associated and recorded in the storage device, to an external apparatus,
   wherein the management manages the received job and the operation log recorded in the storage device before the job is received, by associating the job and the operation log with each other and
   the operation log contains information about an operator who performed the operation and time information.

7. A computer readable storage medium on which is stored a computer program for making a computer execute a method for performing processing specified by a job received from outside, the method comprising:
   recording an operation log based on operations concerning work performed on the image forming apparatus, in a storage device;
   receiving the job from the outside;
   performing the processing specified by the received job based on the work performed on the image forming apparatus;
   recording a job log based on the processed job in the storage device;
   identifying the operation log which is based on the operation corresponding to the job processing and is recorded in the storage unit, and managing the operation log in association with the job; and
   making a notification based on the operation log and the job log associated and recorded in the storage device, to an external apparatus,
   wherein the management manages the received job and the operation log in the storage device recorded before the job is received by associating the job in association with each other and
   the operation log contains information about an operator who performed the operation and time information.

8. A management system including an image forming apparatus configured to perform processing specified by a job received from outside, comprising:

an operation log recording unit configured to record an operation log based on operations concerning work performed on the image forming apparatus, in a database;

a job log recording unit configured to record a job log based on a processed job, in the database after the processing specified by the job received by the image forming apparatus is performed based on the work performed on the image forming apparatus;

a management unit configured to identify the operation log which is based on the operation corresponding to the job processing in the image forming apparatus and is recorded in the database, and to manage the operation log in association with the job; and a notification unit configured to make a notification based on the operation log and the job log associated by the management unit and recorded in the database, wherein the operation log contains information about an operator who performed the operation and time information.

9. The management system according to claim 8, wherein the notification unit makes the notification by displaying content of the job processing, work content performed on the image forming apparatus, information about a worker who performed the work, and man-hours of the work based on the job log and the operation log which are managed in association with each other, in an identifiable manner.

10. An information processing method for a management system including an image forming apparatus configured to perform processing specified by a job received from outside, comprising:

recording an operation log based on operations concerning work performed on the image forming apparatus, in a database;

recording a job log based on a processed job in the database after processing specified by the job received by the image forming apparatus is performed based on the work performed by the image forming apparatus;

identifying the operation log which is based on the operation corresponding to the job processing in the image forming apparatus and is recorded in the database, and managing the operation log in association with the job; and making a notification based on the operation log and the job log associated by the management and recorded in the database, wherein the operation log contains information about an operator who performed the operation and time information.

* * * * *